(12) United States Patent
Cheng

(10) Patent No.: US 6,557,870 B2
(45) Date of Patent: May 6, 2003

(54) MEANS FOR LIMITING DIRECTION OF A STROLLER FRONT WHEEL

(75) Inventor: Ying-Hsiung Cheng, Tainan Hsien (TW)

(73) Assignee: Pao-Hsien Cheng, Tainan Hsien (TW)

( * ) Notice: Subject to any disclaimer, the term of this patent is extended or adjusted under 35 U.S.C. 154(b) by 0 days.

(21) Appl. No.: 09/884,124

(22) Filed: Jun. 20, 2001

(65) Prior Publication Data

US 2002/0195784 A1 Dec. 26, 2002

(51) Int. Cl.$^7$ .............................. B62B 9/08; B60B 33/02
(52) U.S. Cl. .................................... 280/47.38; 16/35 R
(58) Field of Search ................... 16/35 R; 280/642, 280/647, 650, 47.38

(56) References Cited

U.S. PATENT DOCUMENTS

| | | | | |
|---|---|---|---|---|
| 4,028,773 A | * | 6/1977 | Morgan | 16/35 R |
| 4,349,937 A | * | 9/1982 | Fontana | 16/35 R |
| 4,543,685 A | * | 10/1985 | Kassai | 16/35 R |
| 4,570,288 A | * | 2/1986 | Kassai | 16/35 R |
| 4,649,596 A | * | 3/1987 | Kassai | 16/35 R |
| 4,759,098 A | * | 7/1988 | Ko | 16/35 R |
| 5,172,451 A | * | 12/1992 | Chiu | 16/35 R |
| 5,191,674 A | * | 3/1993 | Zun | 16/35 R |
| 5,517,718 A | * | 5/1996 | Eichhorn | 16/35 R |
| 5,975,545 A | * | 11/1999 | Hu | 16/35 R |
| 6,212,733 B1 | * | 4/2001 | Yeh | 16/35 R |

* cited by examiner

Primary Examiner—Brian L. Johnson
Assistant Examiner—Jeffrey Restifo
(74) Attorney, Agent, or Firm—Rosenberg, Klein & Lee

(57) ABSTRACT

A direction limiting structure of a stroller front wheel includes a control lever and an elastic member. The control lever is pivoted to a connecting block supporting the wheel axle, and has a pointed end and an engaging part. The elastic member is attached to the connecting block form a lower end, and has an upper convex part and a middle concave part. The limiting structure further has an engaging gap on an outer side of a support rod of the stroller, which a pivotal rod part of the connecting block passes through. The control lever can be pivoted to a locking position where the pointed end is in the middle concave part of the elastic member and where the engaging part abuts the lower edge of the support rod; when the direction of the wheel changes for the engaging part to face the engaging gap, the elastic member will further bias the pointed end downwards, making the engaging part move into the engaging gap to prevent the direction of the wheel from changing.

1 Claim, 7 Drawing Sheets

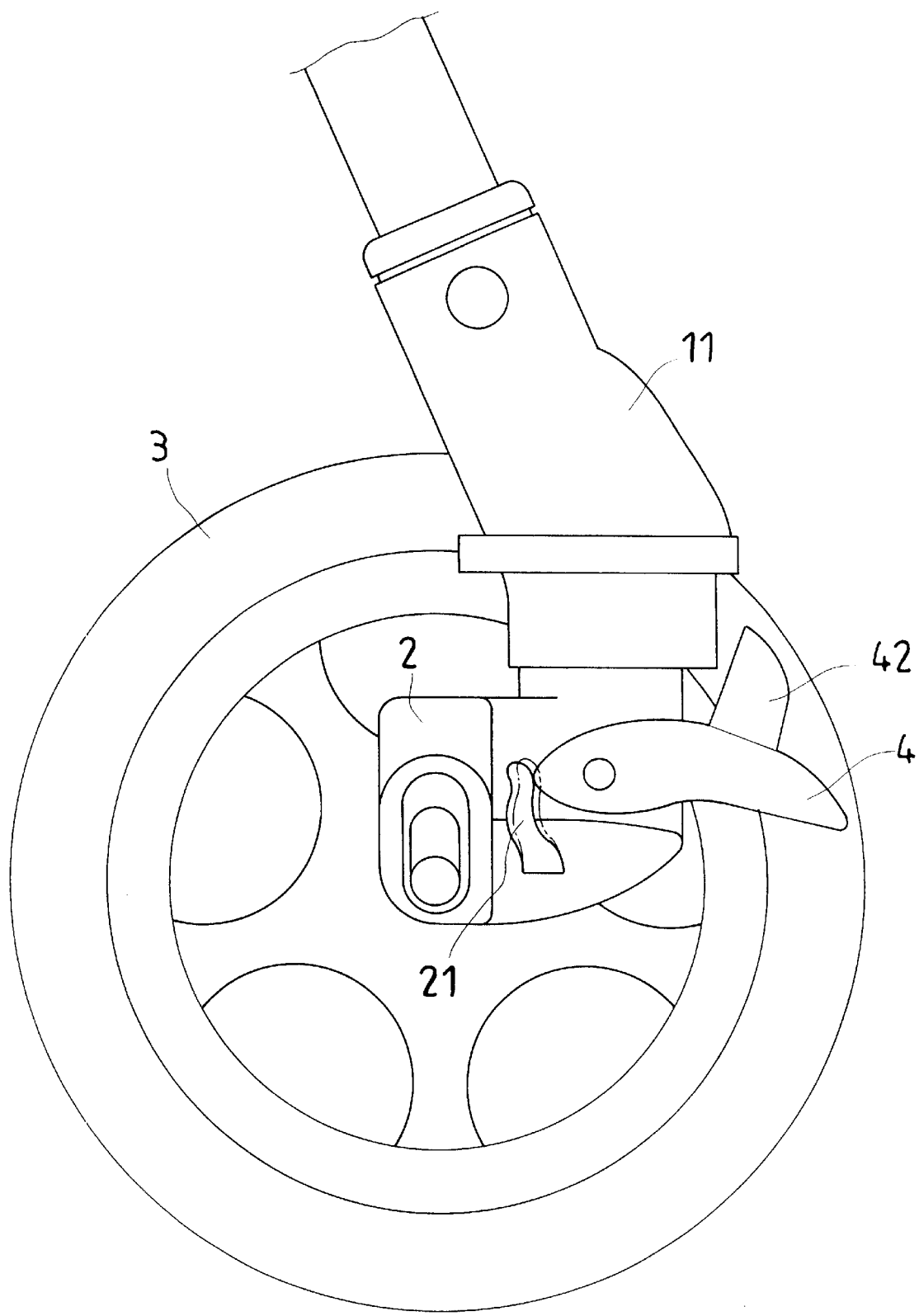
F I G. 2

MEANS FOR LIMITING DIRECTION OF A STROLLER FRONT WHEEL

BACKGROUND OF THE INVENTION

The present invention relates to a front wheel of a stroller, and particularly to one which is provided with a direction limiting means so that the direction the wheel is moving in can be limited to one perpendicular to the front of the stroller.

Referring to FIGS. 6 and 7, a conventional stroller front wheel with direction limiting structure includes a connecting member 20, a pivotal rod 30, a slide block 50, a connecting tube 40 and a front wheel part 60.

The connecting member 20 has an upper tube portion connected to the front support rod 10 of the stroller. The pivotal rod 30 is passed through both the connecting member 20 and the connecting tube 40, which is connected to the axle of the wheel part 60, thus, the direction the front wheel 60 moves in can be changed. The connecting member 20 further has a guide rail 201, and the connecting tube 40 has a guide rail 401 aligned with the guide rail 201. The slide block 50 is movably disposed between the guide rails 201 and 401.

When the slide block 50 is moved upwards along the guide rails 201 and 401 to stay away from the guide rail 401, the front wheel can move along in any direction. When the user wants to limit the direction the front wheel moves in to one perpendicular to the front of the stroller, he or she has to move the slide block 50 downwards to a locking position where a part of same to stay between the rail 201 and the rest between the rail 401.

However, the conventional stroller front wheel is found to have a drawback that it has to be moved to make the guide rail 201 align with the guide rail 401 otherwise the slide block 50 can't be moved to the locking position, i.e. the stroller wheel can't be used very easily.

SUMMARY OF THE INVENTION

Therefore, it is a main object of the present invention to provide a stroller front wheel with a direction limiting means which can be used relatively easily.

The direction limiting means of a stroller front wheel of the present invention includes a control lever and an elastic member. The control lever is pivoted to a connecting block supporting the axle of the wheel, and has a front pointed end and an engaging part sticking up on the other end.

The elastic member is attached to the connecting block from a lower end, and has an upper convex part and an intermediate concave part.

An engaging gap is provided on the rear part of the outer side of a support rod of the stroller; the connecting block has a sticking-up pivotal rod part passing through the support rod. Thus, the control lever can be pivoted between an unlocking position where the pointed end stays above the upper convex part of the elastic member for the engaging part of the control lever to stay away from the engaging gap and a locking position where the pointed end is on the intermediate concave part for the engaging part of the control lever to abut a lower edge of the support rod. The elastic member will bias the pointed end of the control lever further down in the locking position when the direction the wheel moves in changes for the engaging part to face the engaging gap, making the engaging part move into the engaging gap to prevent the direction of the wheel from changing.

So, the user doesn't have to first move the wheel for the engaging part to face the engaging gap for making the direction limiting structure function, i.e. he or she only has to move the pointed end onto the intermediate concave part effortlessly, and the engaging part will automatically engage the engaging gap in the course of the user pushing the stroller along.

BRIEF DESCRIPTION OF THE DRAWINGS

This invention will be better understood by referring to the accompanying drawings, wherein:

FIG. 2 is a side view of the front wheel with the direction limiting structure of FIG. 1 with the control lever moving to the locking position.

DETAILED DESCRIPTION OF THE PREFERRED EMBODIMENT

Figure 1:
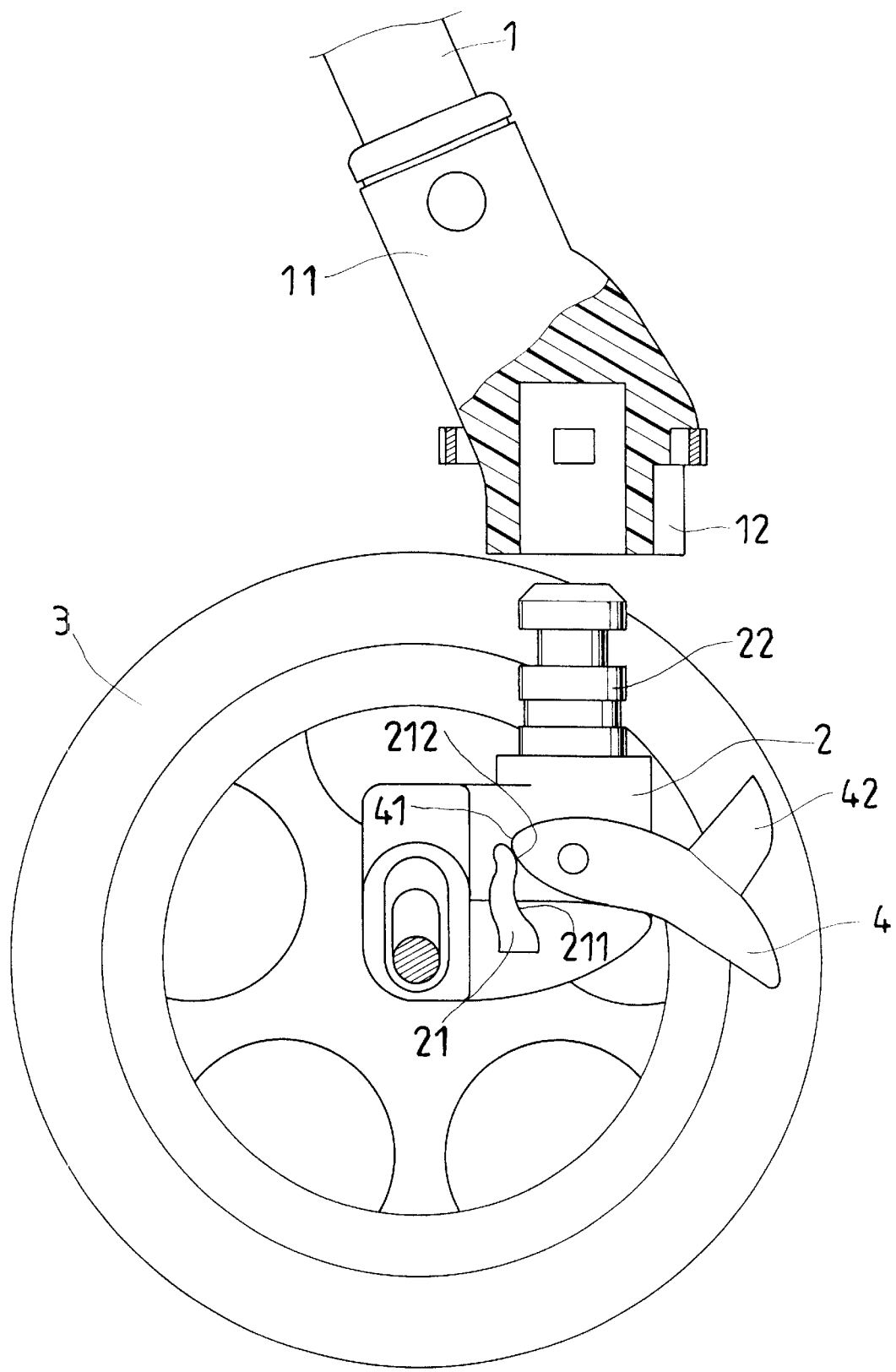
FIG. 1 is a side view of the stroller front wheel with the direction limiting structure according to the present invention.
Figure 3:
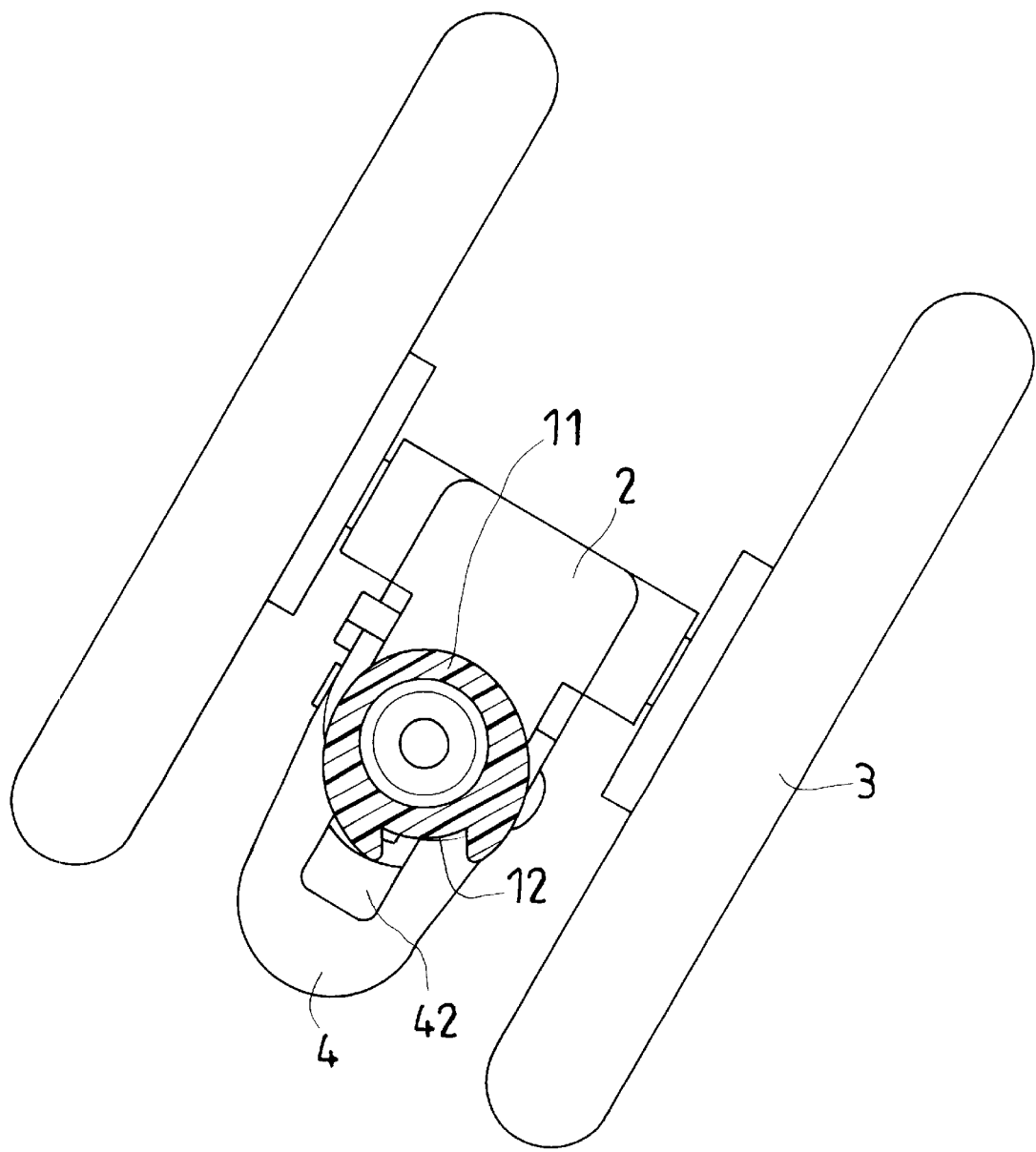
FIG. 3 is a top view of the front wheel with the direction limiting structure of FIG. 1 with the control lever being in the locking position.
Figure 4:
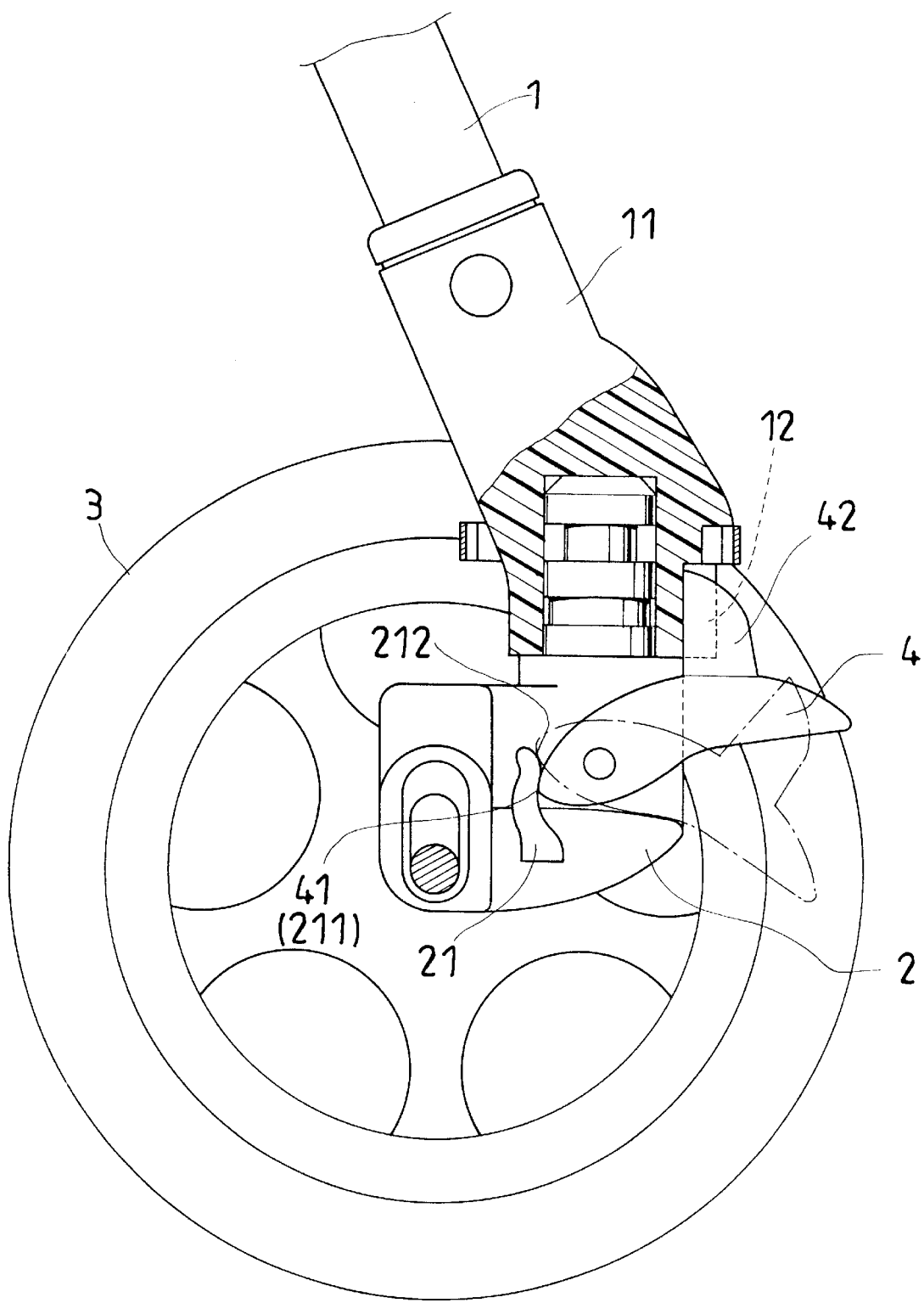
FIG. 4 is side view of the front wheel in FIG. 1 with the engaging part being fitted into the engaging gap for limiting the direction.
Figure 5:
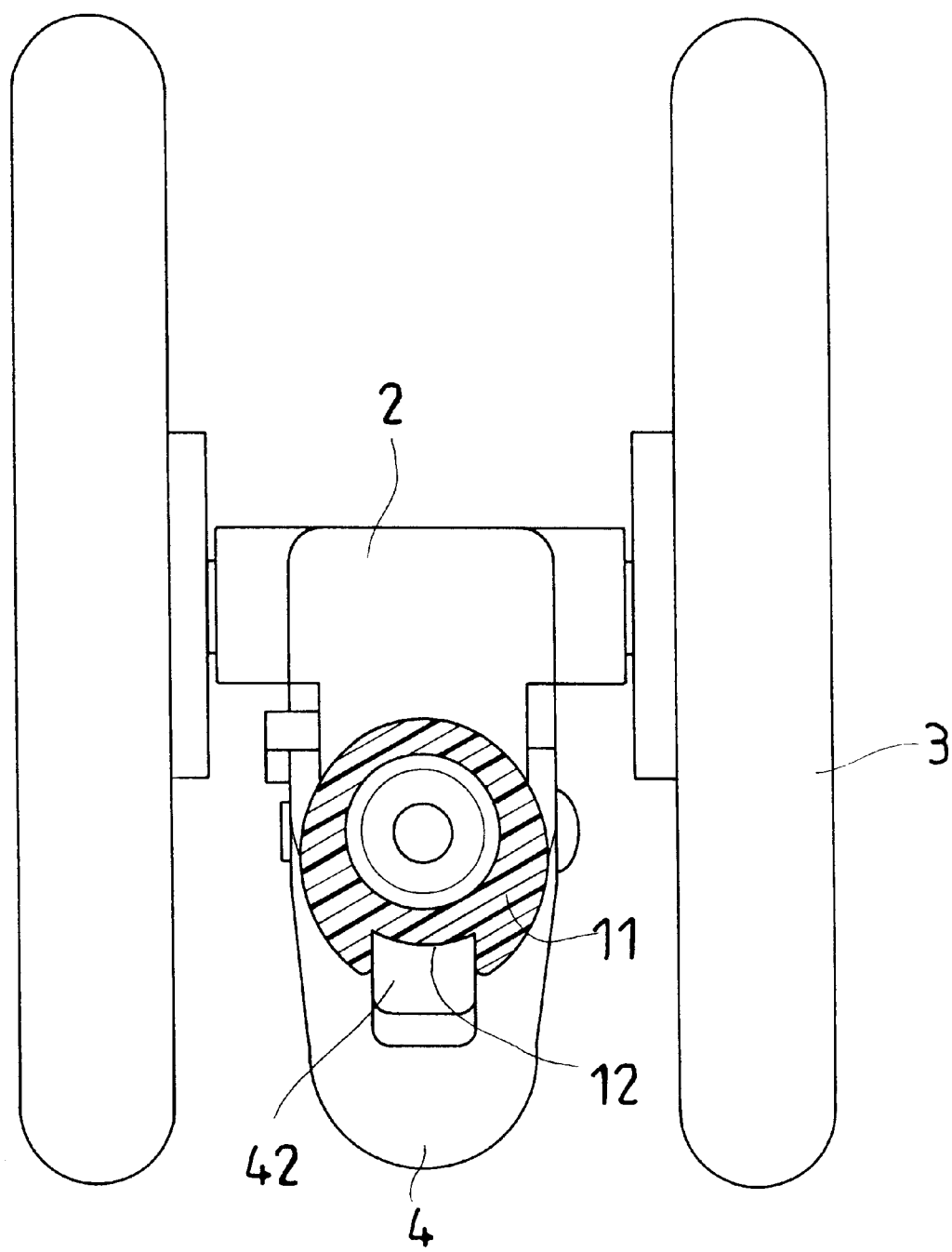
FIG. 5 is a top view of the stroller front wheel in FIG. 1 with the direction being limited to one perpendicular to the front of the stroller.
Figure 6:
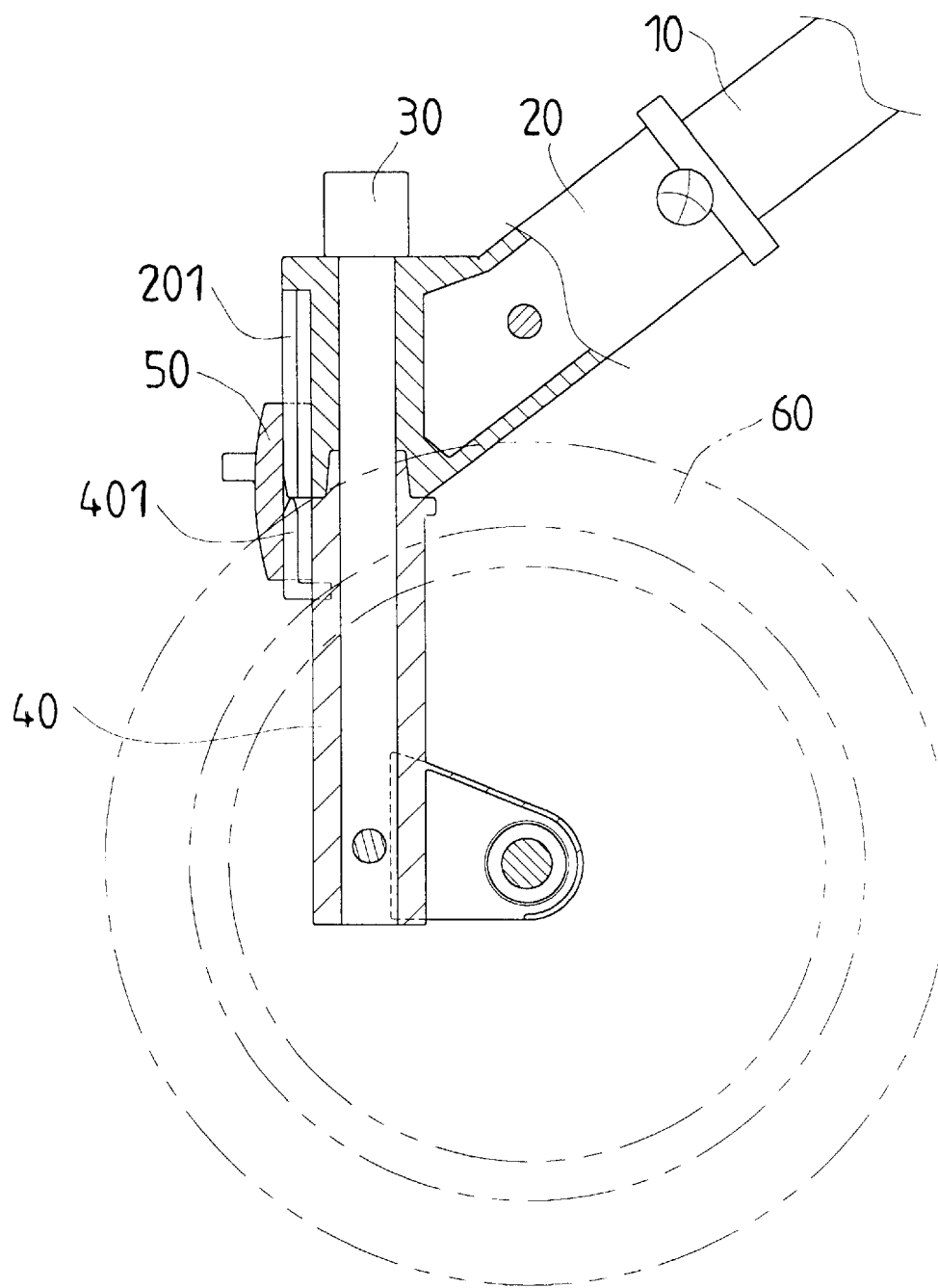
FIG. 6 is a view of the conventional stroller wheel in the Background with the direction limiting structure being in a locking position.
Figure 7:
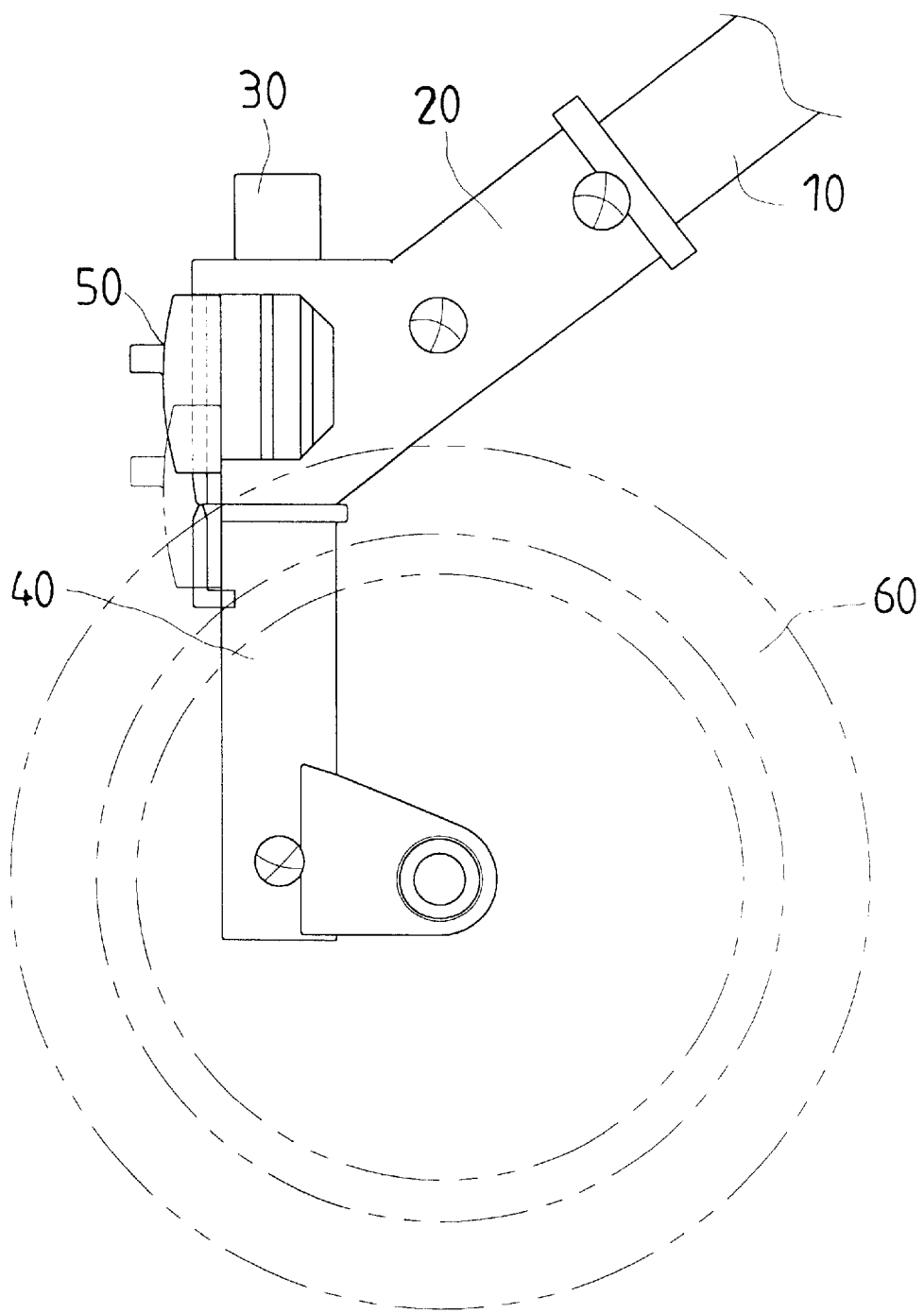
FIG. 7 is a view of the conventional wheel in the Background with the direction limiting structure being in an unlocking position.

Referring to FIGS. 1 and 2, a stroller front wheel with direction limiting structure of the present invention includes a connecting block 2, wheel parts 3 and a control lever 4.

The connecting block 2 supports the axle (not numbered) of the front wheel, and has an elastic member 21 on an outer side. The elastic member 21 has an upper convex part 212, a lower convex part (not numbered), and an intermediate concave part 211 between the upper convex part 212 and the lower convex part. The upper convex part 212 can be moved when an external force is exerted on it, while the lower convex part is stationary.

The connecting block 2 further has a pivotal rod part 22 sticking up. The wheel is connected to a front support rod 1 of the stroller with the pivotal rod part 22 of the connecting block 2 passing into a connecting tube 11 of the front support rod. The connecting tube 11 has an engaging gap 12 on the rear of the outer side.

The control lever 4 is pivoted to the connecting block 2 with a front pointed end 41 facing, and being disposed close to the elastic member 21. The control lever 4 further has an engaging part 42 at the other end of the control lever 4.

The control lever 4 can be pivoted between a locking position where the front pointed end is moved over the upper convex part 212 of the elastic member to rest on the intermediate concave part 211, and an unlocking position where the front pointed end rests on the upper portion of the upper convex part 212; because of the elasticity of the elastic member 21, the front pointed end 41 can be easily moved over the upper convex part 212 by a user, and the intermediate concave part 211 will prevent the front pointed end 41 from moving out unless the user pivots the control lever 4 on the connecting block 2. When the control lever 4 is pivoted to the unlocking position, the engaging part 42 thereof stays away from the engaging gap 12 of the front support rod 1, permitting the front wheel to move along in any direction. When the control lever 4 is pivoted to the locking position, the engaging part 42 of the control lever 4 will abut the lower edge of the connecting tube 11; thus, when the direction the front wheel moves in changes, in the course of the user moving the stroller forwards, for the engaging part 42 to face the engaging gap 12 of the front support rod 1, the elastic member 21 will bias the front pointed end 41 of the lever 4 further down, making the engaging part 42 to engage the engaging gap 12; thus, the direction that the front wheel moves in is limited to one perpendicular to the front of the stroller.

From the above description, the stroller front wheel with direction limiting structure of the present invention can be known to have a desirable feature that the front wheel doesn't have to be moved previously for the engaging part 42 of the control lever 4 to face the engaging gap 12 of the support rod 1 when the use wants to limit the direction of the front wheel, i.e. the user only has to pivot the control lever 4 for the front pointed end 41 to move onto the intermediate concave part 211 of the elastic member 21, using less effort than a user of the conventional stroller wheel in the Background.

What is claimed is:

1. A means of limiting direction of a front wheel of a stroller, comprising:

a control lever pivoted to a connecting block provided to support an axle of said front wheel, said control level having a front pointed end and engaging part at an opposing end of said control lever, said connecting block having a pivotal rod part passing into a front support rod of said stroller;

an elastic member having a lower part fitted onto said connection block, said elastic member having a movable part at an upper end and an intermediate part between said movable part and said lower part, said movable part of said elastic member having a convex shape, and said intermediate part having a concave shape;

an engaging gap formed on a rear of an outer side of said front support rod;

said control lever being movable between an unlocking position where said front pointed end rests on an upper end of said movable part of said elastic member and a locking position where said front pointed end rests on said intermediate part, said engaging part of said control lever staying away from said engaging gap when said control lever is in said unlocking position, permitting a direction of said front wheel to change, said engaging part being biased up to engage said engaging gap by said elastic member when said control lever is moved to said locking position, preventing a direction of said front wheel from changing, said intermediate part biasing said front pointed end downwards for said engaging part of said lever to move into said engaging gap when said control lever is moved to said locking position, and said engaging part faces said engaging gap.

* * * * *